J. A. ZAHAR AND R. A. L. VOLET.
AUTOMATIC INDICATING APPARATUS.
APPLICATION FILED DEC. 24, 1917.

1,384,653.

Patented July 12, 1921.

Witnesses:

Inventors
Joseph A. Zahar
René A. L. Volet
by
Attorney

J. A. ZAHAR AND R. A. L. VOLET.
AUTOMATIC INDICATING APPARATUS.
APPLICATION FILED DEC. 24, 1917.

1,384,653.

Patented July 12, 1921.
7 SHEETS—SHEET 6.

J. A. ZAHAR AND R. A. L. VOLET.
AUTOMATIC INDICATING APPARATUS.
APPLICATION FILED DEC. 24, 1917.

1,384,653.

Patented July 12, 1921.
7 SHEETS—SHEET 7.

Fig. 15

Witnesses:
C. A. Rowe

Inventors
Joseph A. Zahar
René A. L. Volet
By Attorney

UNITED STATES PATENT OFFICE.

JOSEPH ANDRÉ ZAHAR AND RENÉ ALFRED LAURENT VOLET, OF PARIS, FRANCE.

AUTOMATIC INDICATING APPARATUS.

1,384,653.  Specification of Letters Patent.  Patented July 12, 1921.

Application filed December 24, 1917. Serial No. 208,618.

*To all whom it may concern:*

Be it known that we, JOSEPH ANDRÉ ZAHAR and RENÉ ALFRED LAURENT VOLET, the first one citizen by protection of the French Republic and the second one citizen of the French Republic, both residing at Paris, France, have invented certain new and useful Improvements in Automatic Indicating Apparatus, of which the following is a specification.

The invention relates to automatic indicating apparatus intended to give successive indications in a given sequence, for instance the name of the next station in public vehicles. The invention relates more particularly to apparatus in which a flexible band is provided on which are traced inscriptions or other indications intended to appear successively in a suitable window of the said apparatus, the flexible band being secured at both its ends to two storing rollers, and is unwound from one of the said rollers and wound on the other.

The invention has for its main object to make an apparatus of the above mentioned kind operate in a better and more reliable manner than hitherto.

The invention comprises adding to the flexible band of the apparatus such means that, as soon as the said band is started, it acts first of all directly on the motor mechanism so that the said movement continues and afterward, when it has been moved to the desired extent, it acts again directly on the said mechanism so that the band is forced to stop.

The invention further comprises means combined with the said band so that after it has been unwound in one direction to a given extent, it acts on such a reversing device that it is unwound in the opposite direction.

Again the invention comprises an electric motor and two clutches, each comprising a first element loosely mounted on the shaft to be controlled by the said clutch and driven by the motor, and a second element rotating with the said shaft and held in engagement with the first element by a spring and constituting the armature of an electro-magnet through which can pass the current feeding the motor.

The invention further comprises certain other arrangements more explicitly referred to hereinafter.

A construction of the invention is illustrated by way of example in the accompanying drawings, in which:

Fig. 7 shows the electro-magnet in the position of rest, and

Fig. 8 shows the same energized.

The present indicator apparatus comprises two side plates $a$ and $a^1$ intended to support the different parts of the various devices of the apparatus. Those side plates are secured in the interior of a half casing $b$ of triangular section, provided on its two faces with windows $b^1$ in which can appear simultaneously, on both sides at one and the same time, the indications of the apparatus.

Between the side plates $a$ and $a^1$ are arranged two storing rollers $c$ and $c^1$ to which are secured the ends of a flexible band $d$ of suitable length and material which is wound alternately on the said rollers.

The flexible band $d$ passes over guide rollers $e$, the spindles of which are mounted in the side plates $a$ and $a^1$. These rollers $e$ bring the flexible band $d$ in front of the windows $b^1$ of the case $b$.

Figure 7:
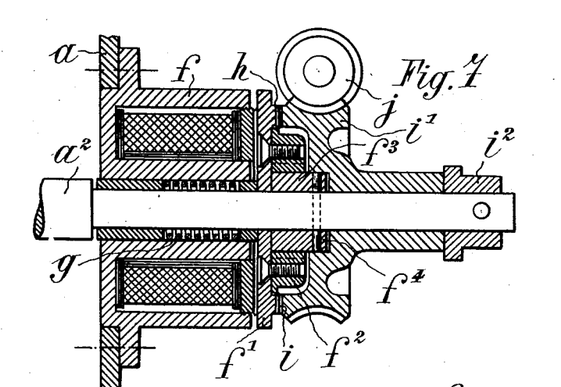
Figs. 7 and 8 show in vertical section one of the electro-magnets and the devices it controls.
Figure 8:
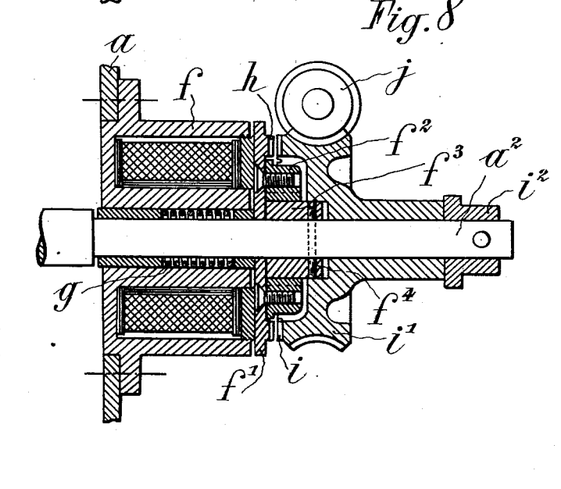

The unwinding of the band $d$ is brought about by means of the following device:

The spindles $a^2$ of the storing rollers $c$ and $c^1$ are extended in front of the side plate $a$ and pass each through an annular inclosed electro-magnet, the frame $f$ of which is secured to the said side plate (Figs. 7 and 8).

The armature of the electro-magnet is constituted by a steel disk $f^1$ secured to a grooved sleeve $f^2$ which can slide on a brass nut $f^3$ secured to the spindle $a^2$ and provided with a series of longitudinal keys. The armature therefore slides freely on the spindle $a^2$, while participating in the rotation of the latter.

Figure 9:
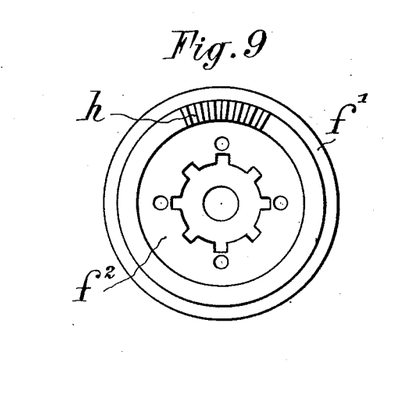
Figs. 9 and 10 show the two parts of a claw clutch controlled by the electro-magnet.
Figure 10:
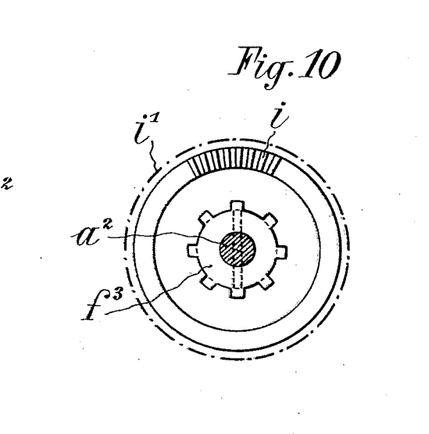

In normal times, the disk $f^1$ is held away from the electro-magnet by the action of a spring $g$ mounted on the spindle $a^2$ and resting on a shoulder provided on the latter. The disk $f'$ has a rim of radial teeth $h$ on its rear face constituting one of the parts of a claw clutch (Fig. 9). This toothed rim $h$ engages, under the action of the spring $g$, with a similar toothed rim $i$ secured to a worm pinion $i^1$. The latter is mounted loosely on the spindle $a^2$, without moving longitudinally on the said spindle, the said pinion being held on one side by a shoulder $f^4$ of the key nut, and on the other side by a collar $i^2$ secured to the spindle (Figs. 7 and 8).

The pinion $i^1$ constantly engages with a worm $j$ arranged at the end of the shaft of an electric motor $j^1$ mounted on the side plate $a$ between the two electro-magnets. The shaft of the motor $j^1$ is provided with a worm $j$ at each of its ends, the threads of the said worms being of opposite direction.

The current is supplied to the motor $j^1$ by means of a device hereinafter described. This device comprises a device for reversing the direction of movement of the flexible band, enabling one or other of the electromagnets to be energized. According to the position of the reversing device, the motor is connected in series to one or the other of the said electro-magnets. In the position of rest, both these electro-magnets are inoperative, and the teeth $h$ of the armature $f^1$ are both in engagement, owing to the action of the springs $g$, with the teeth $i$ of the pinions $i^1$.

Figure 3:
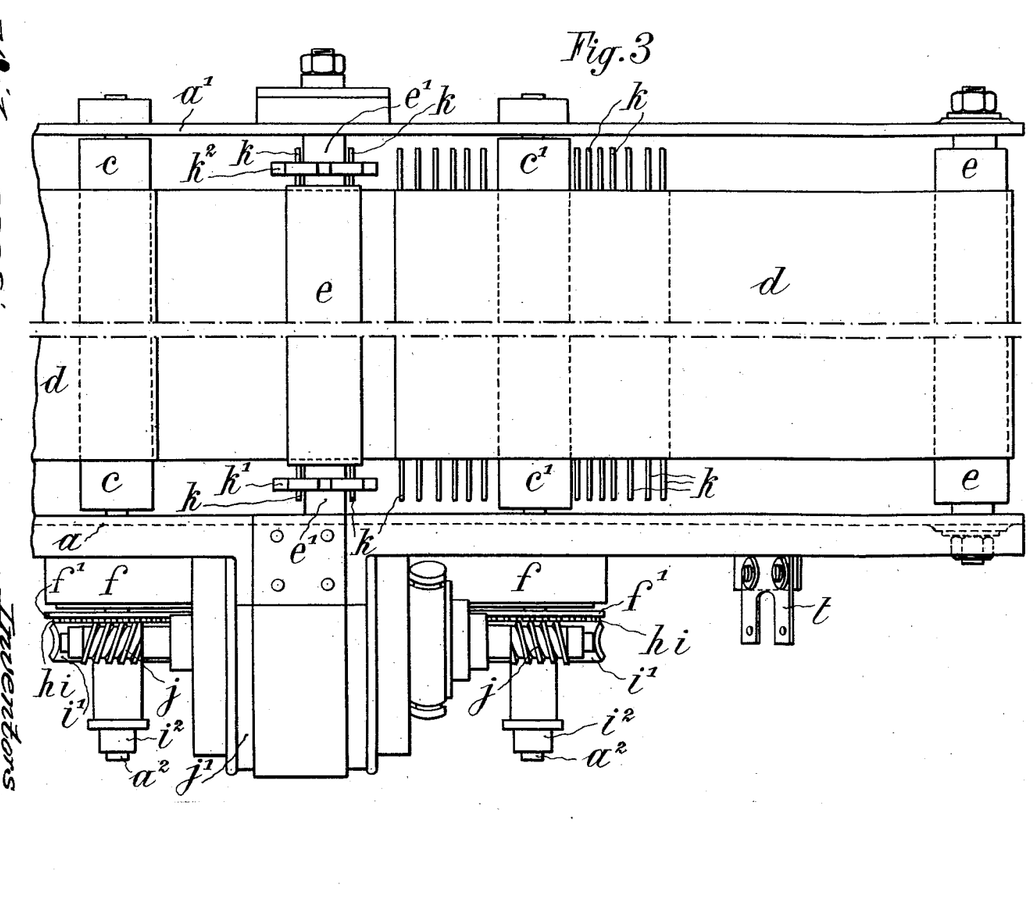
Fig. 3 shows the apparatus in plan.

The two storing rollers $c$ and $c^1$ are therefore secured to the said pinions through the intermediary of: the spindles $a^2$, the key nuts $f^3$, the armature $f^1$ and the claw clutches $h$ $i$. The two worms $j$ being stationary and their engagement non-reversible, the two storing rollers are absolutely locked (Figs. 3 and 7).

On the electric current being closed, as described later on, the current passes through the motor $j^1$ and one of the electromagnets. The latter immediately attracts its armature $f^1$, so that the two parts of the claw clutch are moved away from each other, and therefore the corresponding pinion $i^1$ released, whereupon the said pinion rotates loosely on the spindle $a^2$, being driven by the worm $j$ driven by the motor which has started (Fig. 8).

As the other electro-magnet is not energized, the mechanism controlled by it, remains in the same position as during the locking, so that the pinion $i^1$ secured to the spindle $a^2$, will drive the latter and winds up the flexible band $d$ on the corresponding storing roller. The traction effort of the said band produces its unwinding from the other storing roller.

This unwinding of the band takes place without any possibility of slack, owing to the magnetic braking exercised on the spindle of the non-driven storing-roller. This braking is produced by the armature $f^1$ of the energized electro-magnet which engages with the face of the electromagnet, as shown in Fig. 8. As the disk $f^1$ constituting the armature, remains secured to the spindle $a^2$ of the storing roller by means of the key nut $f^3$, this disk rotates with the spindle and causes sufficient friction on the electro-magnet which is fixed, to keep the flexible band stretched. When the circuit is broken, the active electro-magnet ceases to be energized. The armature $f^1$ being no longer attracted, is pushed back by its spring $g$, and its teeth $h$ again engage with the teeth $i$ of the corresponding worm pinion $i^1$.

At this moment the *vis-viva* of the motor from which the current has been cut off at the same time as from the electro-magnet, simultaneously operates, for a very short time, the two storing rollers $c$ and $c^1$ which rotate in opposite directions under the action of their driving device. This re-winding of the flexible band simultaneously on the two storing rollers produces a tension of the band, greater than that which existed at the moment of its unwinding. The value of this tension can be regulated at will, both by the speed of the motor, by the total momentum of the said motor and of the shaft carrying the worms, for instance by adding fly wheels.

As soon as the stoppage takes place, the whole mechanism of the apparatus is locked, as already explained, and the flexible band thus remains perfectly stretched in front of the windows of the casing $b^1$.

As already stated, the flexible band $d$, each time that the storing rollers are operated, must be unwound, to an extent corresponding to two simultaneous zones of visibility, that is to say, the same indication written twice one after another on the band, must appear simultaneously in the two windows of the casing.

The mechanism enabling the flexible band to be fixed in this position, is constituted as follows:

On the band $d$, at such distances that the interval comprised corresponds to two successive zones of visibility, are secured transversely groups of two rods or pins $k$ preferably of rectangular cross-section. The two rods of each group are arranged at a comparatively short distance from each other.

The pins thus arranged project at each side beyond the edges of the flexible band $d$, so that, when they are moved, they operate a device which, in the construction illustrated, is constituted by two four-branch stars $k^1$ and $k^2$ secured to the ends of the spindle $e^1$ of one of the guide rollers $e$ rotating loose on the said spindle.

In the construction illustrated, this guide roller is that situated at the bottom portion of the apparatus.

Figure 1:
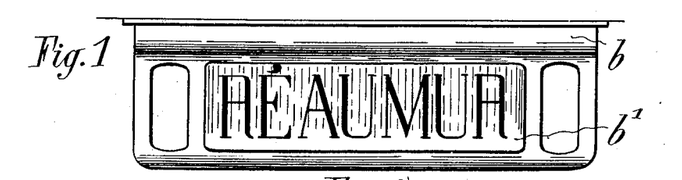
Figure 1 shows the apparatus as a whole.
Figures 2, 11:
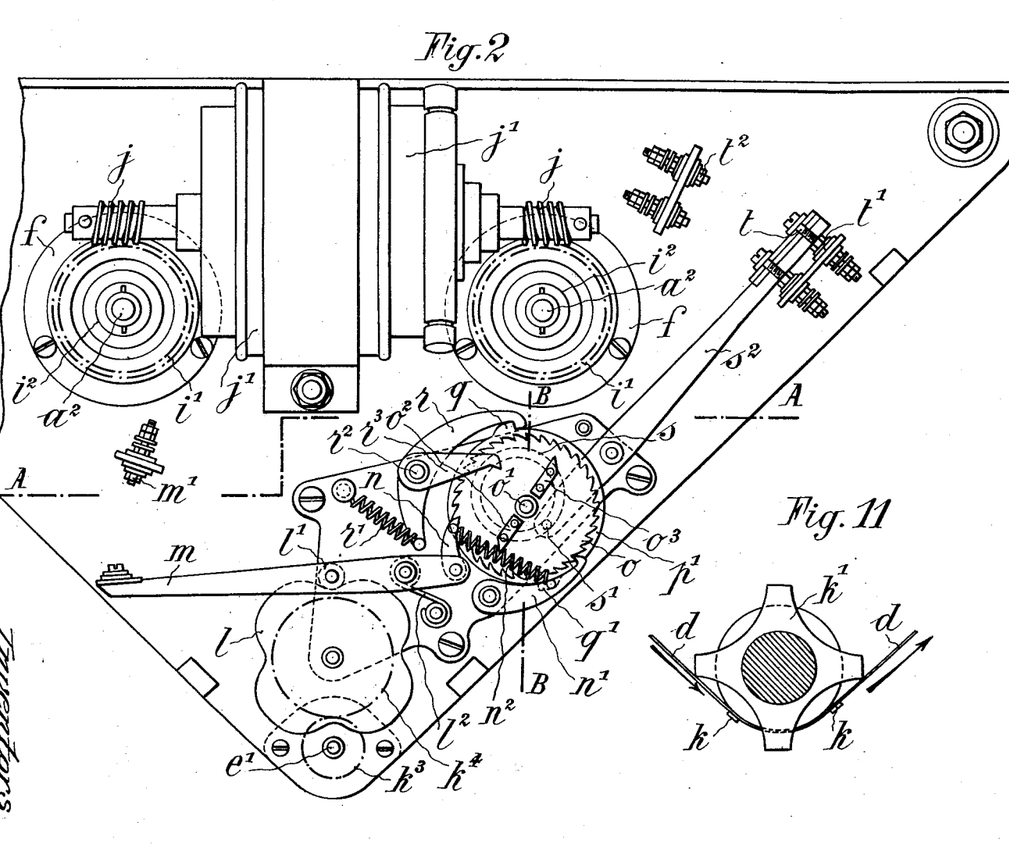
Fig. 2 shows in elevation the driving mechanism.
Fig. 11 is a detail view showing the part operated by the rods of the flexible band.
Figure 4:
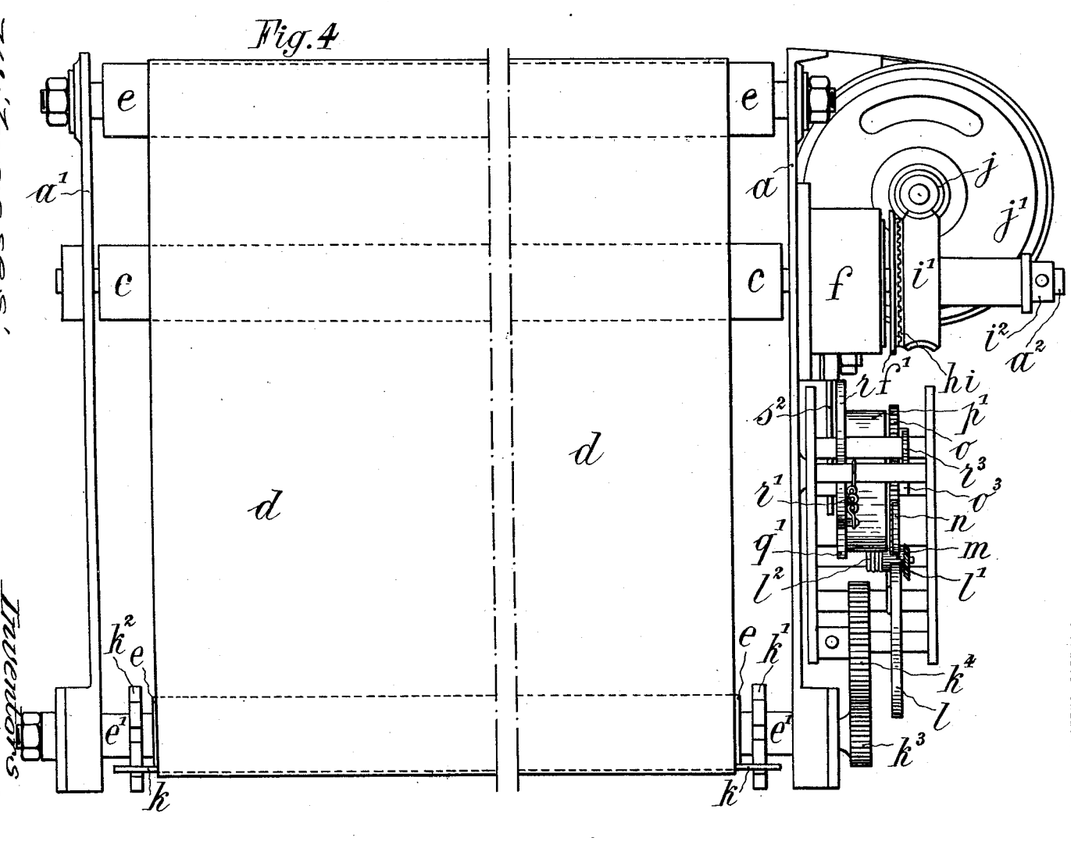
Fig. 4 is a side elevation.
Figure 5:
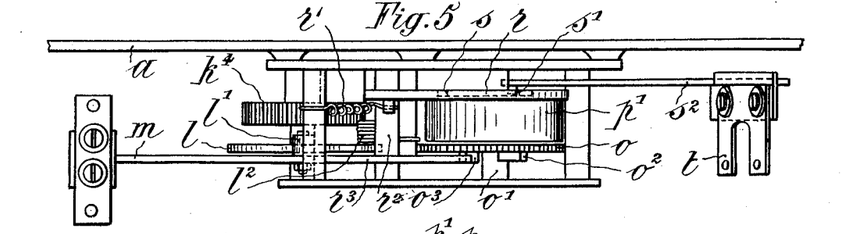
Fig. 5 is a horizontal section on the line A—A of Fig. 2.
Figure 6:
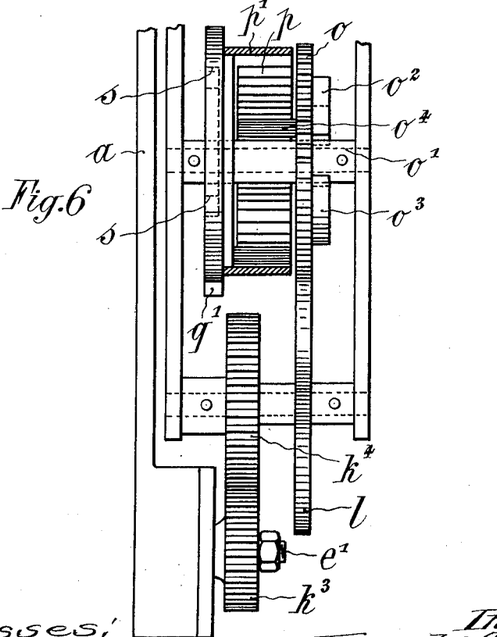
Fig. 6 is a vertical section on an enlarged scale, on the line B—B of Fig. 2.
Figure 12:
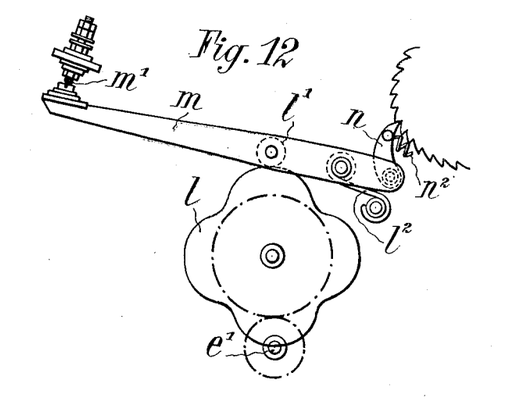
Fig. 12 shows the movement of the contact controlled through the part shown in Fig. 11.

The spindle $e^1$ drives, either directly, or through two toothed wheels $k^3$ and $k^4$ (Figs. 4 and 6), a cam $l$ with a number of projections which must correspond, taking into account the ratio of the intermediate gear wheels, to half the number of the branches of the stars $k^1$ and $k^2$. On the said cam $l$ can travel a roller $l^1$ mounted on a lever $m$ forming a switch (Figs. 2 and 12). The roller $l^1$ is constantly maintained in contact with the circumference of the cam $l$ by the action of a spring $l^2$ acting on the lever $m$.

The operation of the device is as follows:

The apparatus being stopped, the two pins $k$ of one group, are at either side of one of the branches of the star $k^1$ as shown in Fig. 11. During the previous unwinding of the flexible band, one of the said pins produced the opening of the electric current. The other pin is ready to act on the branch of the star, as soon as the flexible band $d$ starts. On the other hand, the roller $l^1$ is in one of the recesses of the cam $l$ (Fig. 2).

Figure 15:
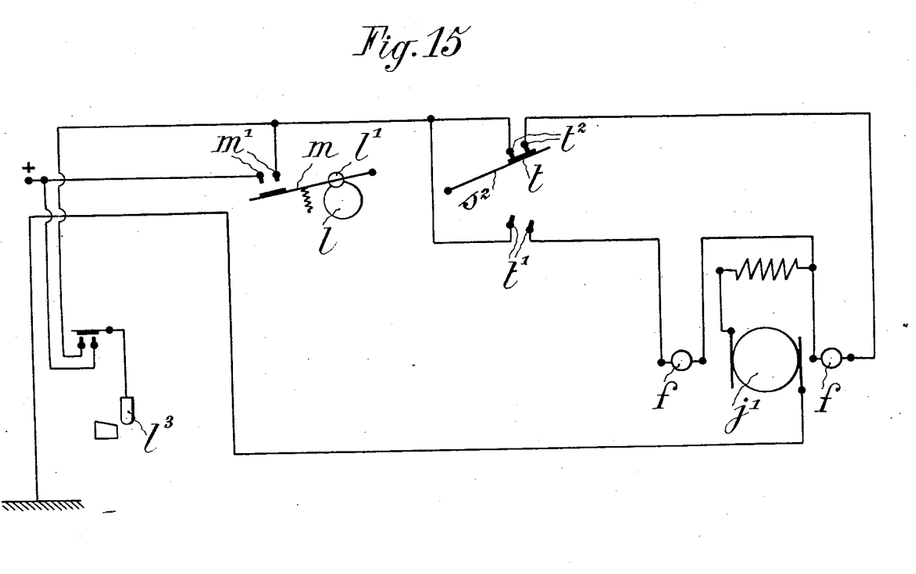
Fig. 15 is a diagram of electric connections.

With the help of any desired electric device, for instance a suitably arranged push button or a contact $l^3$ (Fig. 15) when the apparatus is mounted on a public vehicle, a momentary current is sent into the electric circuit. The motor $j^1$ starts immediately and drives the flexible band $d$ in the manner hereinbefore described. As soon as the band $d$ is moving, the second pin $k$ which was in contact with one of the branches of the star $k^1$ turns the latter, which results in the cam $l$ being turned through the intermediary of the toothed wheels $k^3$ and $k^4$. This movement of the cam produces a rising of the lever $m$ which closes the circuit finally by engaging with contacts $m^1$ as shown in Fig. 12. The flexible band $d$ is then unwound to an extent corresponding to the length of the double panel to be exposed.

After the passage of the said panel, the first of the two pins $k$ of the next group, strikes one of the branches of the star $k^1$ which is turned again and drives the cam $l$. The switch lever $m$ the roller $l^1$ of which is in contact with the said cam, is lowered and cuts off the current, which results in stopping the unwinding of the flexible band. The second pin of the group, the first pin of which has just broken the circuit, is ready to operate, the star $k^1$ so that a fresh momentary passage of current produces a fresh driving of the flexible band, and so on; the operations of starting and stopping can be repeated as many times as may be desired.

When the flexible band $d$ is completely wound on one of the storing rollers $c$ or $c^1$, it is necessary that the said band should be unwound in the opposite direction.

To that end the present apparatus is provided with a reversing device constituted as follows:

At the end of the switch lever $m$ is pivoted a pawl $n$ engaging with a ratchet wheel $o$ comprising a number of teeth, equal to twice the number of panels of the flexible band, less two. This ratchet wheel $o$ which on the other hand is held by means of a counter pawl $n^1$ controlled by a spring $n^2$ connected to the pawl $n$, is mounted loosely on a spindle $o'$.

On the outer face of the ratchet wheel $o$ are arranged, on one and the same dimeter, two stops $o^2$ $o^3$ the outer edge of each of which is beveled so as to form an inclined plane.

The inner face of the ratchet wheel $o$ has a crank pin $o^4$ used to set a spiral spring $p$ contained in a barrel $p^1$ mounted on the spindle $o^1$, to which is secured the other end of the spring $p$.

The circumference of the barrel $p^1$ has two diametrically opposite projections $q$ and $q^1$ with which engages a pawl $r$ controlled by a spring $r^2$ and secured to a pin $r^1$. The latter also carries another pawl $r^3$ which may be raised by the stops $o^2$ and $o^3$ secured to the ratchet wheel $o$, so that the movement of said pawl $r^3$ brings about rising of the pawl $r$ for the purpose of releasing the barrel $p^1$. On the cover of the latter, and outside, is provided an eccentric circular groove $s$ with which engages a nipple $s^1$ secured to a reversing lever $s^2$ which carries for the purpose the contacts required for altering the electrical connections so that in one position of the said lever, the current passes through one of the electro-magnets and the motor, and in the other, through the other electro-magnet and the motor. In one of the positions of the reversing device, the motor drives the flexible band for instance from left to right, and in the other position the band is unwound from right to left.

In the construction illustrated, this result is obtained by means of a double contact $t$ carried by the lever, and two fixed contacts $t^1$ and $t^2$.

Figures 13, 14:
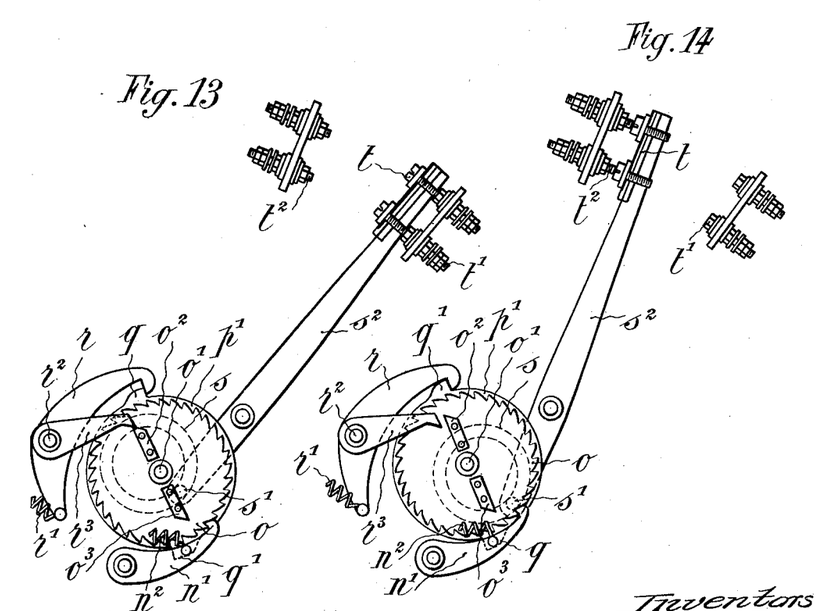
Figs. 13 and 14 show in two positions the device for reversing the direction of movement.

The reversing device described works in the following manner:

At each interruption of the current, corresponding to the unwinding of one of the double panels carried by the flexible band $d$, the pawl $n$ of the switch lever $m$ causes the ratchet wheel $o$ to advance to the extent of one tooth, the said wheel progressively setting the spiral spring $p$. When the ratchet wheel $o$ has turned to about half a revolution, the pawl $r^3$ meets the inclined plane of the stop $o^2$ or $o^3$ and is raised by it, which results in a corresponding rise of the pawl $r$ as shown in Fig. 13. At a certain moment after the ratchet wheel has turned exactly to half a revolution, the pawl $r$ is disengaged from the projection $q$ or $q^1$ with which it was in engagement, thus releasing the barrel $p^1$ which suddenly turns to half a revolution under the action of the spring $p$, that is to say until the other projection $q$ or $q^1$ engages with the pawl $r$. In rotating, the barrel $p^1$ operates by means of the eccentric groove $s$ and of the nipple $s^1$, the reversing lever $s^2$ which is moved for instance from the position shown in Fig. 2, into that shown in Fig. 14, the direction of movement of the flexible band $d$ thus being reversed.

The various phases of the movement described are then repeated, that is to say, the spiral spring is progressively set to half a revolution, and then suddenly expands to half a revolution, the reversing lever being angularly moved, and so on.

It will be readily understood from the preceding that the operation of the apparatus is always insured, the movements of its various parts being all positive and controlled by the unwinding of the flexible band carrying the indications.

When the apparatus is not working, in the casing are provided at each side two longitudinal boxes, each containing a curtain wound like the blinds of a railway carriage and intended to cover the indications of the apparatus.

As already stated, the present apparatus is chiefly intended to show the names of successive stations in public vehicles, but it could also be applied for other purposes.

It could be used for instance in the following cases.

Indication of time in public places in which case it is controlled by means of a parent clock.

Announcement of departures of trains in waiting rooms; the apparatus is then worked either by hand, or by a parent clock.

Advertising by successive panels in shop windows, theaters etc.

The arrangements hereinbefore described are given by way of example, and the shapes, dimensions and detail arrangements may vary according to circumstances.

Having now particularly described and ascertained the nature of our said invention and in what manner the same is to be performed, we declare that what we claim is:—

1. An automatic indicating apparatus comprising, in combination, a flexible band, a pair of rollers coöperating with said band, an electric motor, transmission mechanism between said motor and each of said rollers and adapted to actuate said rollers to cause travel of said band in opposite directions respectively, each of said transmission mechanisms including a normally engaged clutch, and electromagnetic means for alternatively disengaging said clutches, said electromagnetic means causing the transmission mechanism of the disengaged clutch to act as a brake upon the corresponding roller to maintain a tension upon said band.

2. An automatic indicating apparatus comprising, in combination, a flexible band, a pair of rollers coöperating with said band, an electric motor, transmission mechanism between said motor and each of said rollers and adapted to actuate said rollers to cause travel of said band in opposite directions respectively, each of said transmission mechanisms including a clutch, each of said clutches comprising two coöperating elements, a spring for normally engaging the elements of each of said clutches, a pair of electromagnets for disengaging the elements of said clutches respectively, one of the elements of each of said clutches constituting the armature of the corresponding electromagnet, and means whereby said electromagnets may be alternatively energized.

3. An automatic indicating apparatus comprising, in combination, a flexible band, a pair of rollers coöperating with said band, an electric motor and connections for actuating said rollers to cause travel of said band, projections carried by said band and arranged in pairs thereon, a star wheel engaged and intermittently operated by the projections of each pair, in succession, a cam operated by said star wheel, and a switch lever operated by said cam for controlling the circuit of said motor, said cam having portions adapted upon successive operations of said star wheel to alternately open and close said circuit.

4. An automatic indicating apparatus comprising, in combination, a flexible band, means for feeding said band, means for starting and stopping said feeding means, means controlled by said band for operating said starting and stopping means, a member progressively moved by said starting and stopping means upon successive operations thereof, and means operated by said progressively moved member after a predetermined number of operations of said starting and stopping means for reversing said feeding means.

5. An automatic indicating apparatus comprising, in combination, a flexible band, a pair of rollers coöperating with said band, actuating means coöperating with said rollers to cause travel of said band, projections carried by said band and arranged in pairs thereon, means coöperating with said projections for controlling said actuating means, said controlling means being engaged and operated by one of the projections of each pair to stop the travel of said band, and being engaged and operated by the other projection of each pair to start the travel of said band, a member progressively moved by said controlling means upon successive operations thereof, and means operated by said progressively moved member after a predetermined number of operations of said controlling means for reversing the direction of travel of said band.

6. An automatic indicating apparatus comprising, in combination, a flexible band, means for feeding said band, means for starting and stopping said feeding means, means controlled by said band for operating said starting and stopping means, means for reversing said feeding means, means including a spring for actuating said reversing means, means for restraining said actuating means, and a member progressively moved by said starting and stopping means upon successive operations thereof for winding said spring, said member having means for periodically releasing said restraining means.

7. An automatic indicating apparatus comprising, in combination, a flexible band, means for feeding said band, means including a switch lever for starting and stopping said feeding means, means controlled by said band for operating said switch lever, means including a second switch lever for reversing said feeding means, a spring barrel having projections thereon and provided with means for actuating said second switch lever, a spring in said barrel for actuating the same, a pawl coöperating with said projections to restrain said barrel, a ratchet wheel connected with said spring for winding the same, stops on said ratchet wheel for releasing said pawl, and a pawl carried by said first-named switch lever for progressively advancing said ratchet wheel as said switch lever is successively operated.

In testimony whereof we have hereunto set our hands in presence of two subscribing witnesses.

JOSEPH ANDRÉ ZAHAR.
RENÉ ALFRED LAURENT VOLET.

Witnesses:
   CHAS. P. PRESSLY,
   PAUL PLUM.